United States Patent [19]

Labonville

[11] Patent Number: 5,423,365
[45] Date of Patent: Jun. 13, 1995

[54] MULTIPLE PURPOSE TIRE CHAINS

[76] Inventor: Richard P. Labonville, P.O. Box 398, Berlin, N.H. 03570

[21] Appl. No.: 212,160

[22] Filed: Mar. 14, 1994

[51] Int. Cl.6 .............................................. B60C 27/08
[52] U.S. Cl. ...................................... 152/239; 152/243
[58] Field of Search ..................... 152/239, 231, 243

[56] References Cited

U.S. PATENT DOCUMENTS

| | | | |
|---|---|---|---|
| 1,461,378 | 7/1923 | Borst, Jr. | 152/239 |
| 1,565,497 | 12/1925 | Rankin | 152/239 |
| 1,574,014 | 2/1926 | Allmon | 152/240 |
| 1,635,017 | 7/1927 | Sunde | 152/239 |
| 1,763,998 | 6/1930 | Allmon | 152/240 |
| 1,917,161 | 7/1933 | Smith | 152/239 |
| 3,111,155 | 11/1963 | Roland | 152/239 |
| 3,631,912 | 1/1972 | Rieger et al. | 152/239 |
| 3,768,533 | 10/1973 | Gower | 152/239 |
| 3,768,534 | 10/1973 | Gower | 152/239 |
| 4,020,885 | 3/1977 | Sato | 152/239 |
| 4,106,542 | 8/1978 | Dohmeier | 152/239 |
| 4,274,461 | 6/1981 | Yamamoto | 152/187 X |
| 4,303,116 | 12/1981 | Holzwarth | 152/224 |
| 4,357,975 | 11/1982 | Baldry | 152/223 |
| 4,361,178 | 11/1982 | Gower | 152/172 |
| 4,836,258 | 6/1989 | Ellis | 152/213 A |
| 4,889,172 | 12/1989 | Zeiser et al. | 152/226 |

Primary Examiner—Michael W. Ball
Assistant Examiner—Francis J. Lorin
Attorney, Agent, or Firm—Samuels, Gauthier & Stevens

[57] ABSTRACT

An anti-skid tire chain for use on both soft and frozen terrain is disclosed. The chain comprises a pair of parallel side chains adapted to encircle opposite sides of a tire, a plurality of traction units such as rings aligned medially between the side chains and spaced one from the other around the tread surface of the tire, and intermediate chain networks connected at outer locations to the respective side chains and at inner locations to successive traction units. There are lugs on the traction units and studs on the intermediate chain networks. The lugs and the studs protrude outwardly from the tread surface of the tire.

13 Claims, 2 Drawing Sheets

MULTIPLE PURPOSE TIRE CHAINS

BACKGROUND OF THE INVENTION

The invention relates to traction chains of the type employed on the tires of heavy duty vehicles, in particular commercial off-road vehicles such as loggers.

It is known to provide heavy duty vehicle traction chains with studs for increased traction on slippery terrain. As shown in U.S. Pat. Nos. 3,768,534 and 4,361,178 (both to Gower), traction studs may be provided on chain links and positioned to protrude radially outwardly from the tire.

Applicant has discovered, however, that although traction studs may be effective on frozen ground, traction protrusions having a larger surface area are more effective on soft ground such as mud and deep snow. As shown in U.S. Pat. No. 4,357,975 to Baldry traction lugs (which are larger in surface area than the studs) may be disposed on centrally located traction rings for providing enhanced traction on soft ground. Applicant has also discovered that lugs are not sufficiently effective on frozen ground due to their inability to significantly penetrate the ground.

Since stud chains are more effective on frozen ground and lug chains are more effective on soft ground, it is presently necessary to have two sets of chains. Not only is this expensive, but in order to optimize traction chain performance, the traction chains must be switched periodically to accommodate various changes in terrain. This a time consuming and labor intensive process since each chain unit for each wheel might weigh from 750 lbs. to over 1500 lbs. Moreover, in certain conditions the ground may be frozen in some places and soft in close by places. This might be the case when there is soft snow near ice, or in the spring when portions of the ground thaw out and become muddy sooner than other portions that remain frozen.

There is a need therefore for a traction chain that is effective on both soft and frozen ground.

SUMMARY OF THE INVENTION

In accordance with the present invention, an anti-skid tire chain for use on both soft and frozen terrain is provided. The chain comprises a pair of parallel side chains adapted to encircle opposite sides of a tire, a plurality of traction units such as rings aligned medially between the side chains and spaced one from the other around the tread surface of the tire, and intermediate chain networks connected at outer locations to the respective side chains and at inner locations to successive traction rings.

The traction rings include lugs and the intermediate chain networks include chain links having studs. The lugs and the studs protrude radially outwardly from the tread surface of the tire and enhance the ability of the tire chain to achieve sufficient traction on both soft and hard terrain. In particular, the lugs provide enhanced traction on soft ground and the studs provide enhanced traction on hard ground.

BRIEF DESCRIPTION OF THE DRAWINGS

The following detailed description of the present invention may be further understood with reference to the accompanying drawings in which.

DETAILED DESCRIPTION OF THE PREFERRED EMBODIMENT

Figure 1:
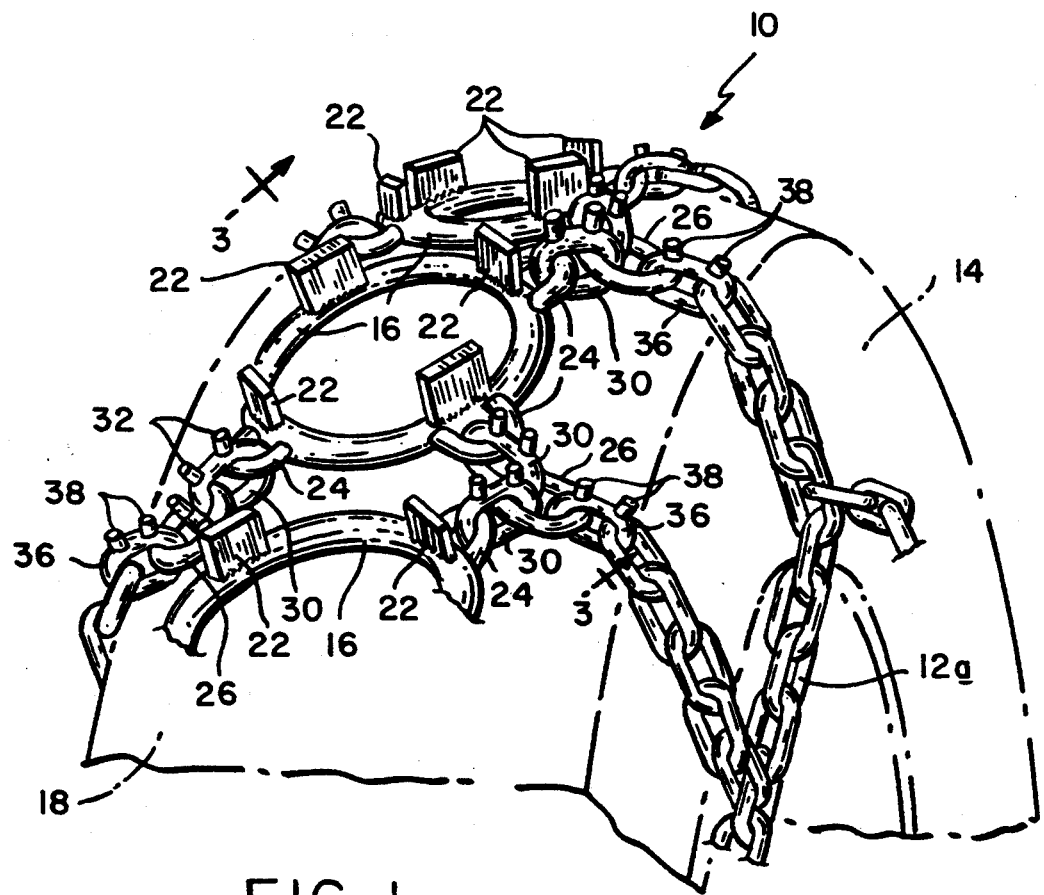
FIG. 1 is a partial isometric view of a tire chain of the invention on a vehicle tire.
Figure 2:
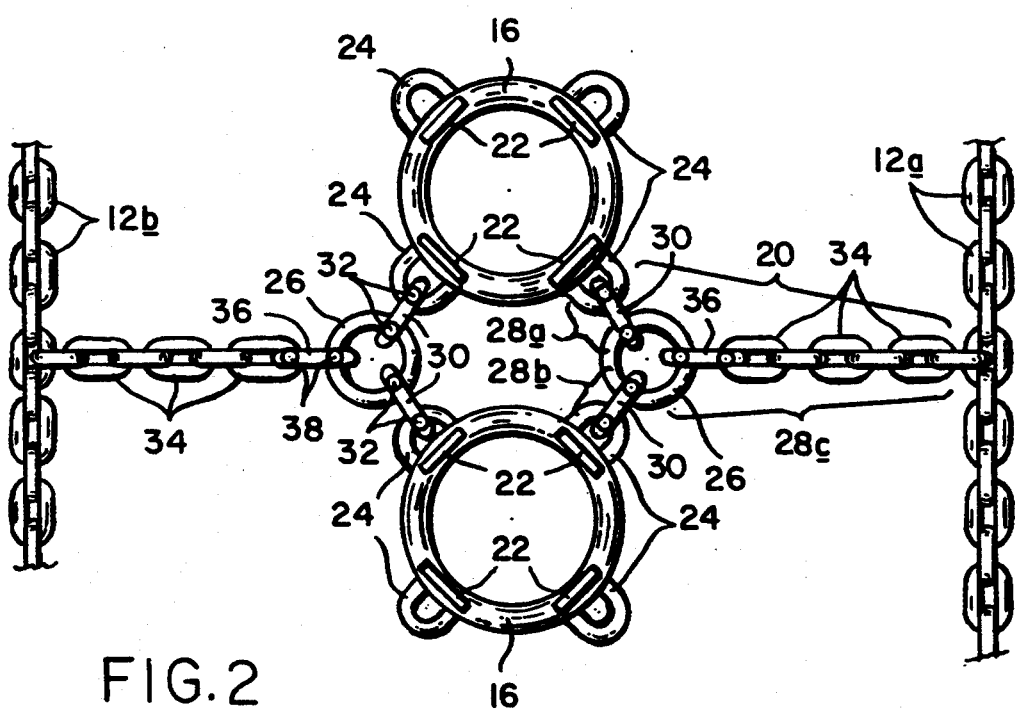
FIG. 2 is a partial plan view of the tire chain shown in FIG. 1.

As shown in FIGS. 1 and 2 a tire chain 10 of the invention includes two parallel side chains 12a, 12b each adapted to encircle opposite sides of a tire 14, and a plurality of traction rings 16 aligned medially between the parallel side chains 12 and circumferentially disposed around the tread surface 18 of the tire 14. The tire chain 10 also includes intermediate chain networks 20 connected at outer locations to respective side chains 12 and at inner locations to successive traction rings 16.

The traction rings 16 are centrally located around the tread surface 18 of the tire 14, and include traction lugs 22 positioned on the outward facing planar surface of the rings 16. The traction rings 16 are connected to the intermediate chain networks 20 through chain eyelets 24 positioned along the curved outer surface of the traction rings 16. The intermediate chain networks 20 are in turn connected to respective parallel side chains 12. The four arcuate lugs 22 on each traction ring 16 are positioned opposite one another as shown in FIGS. 1 and 2.

The intermediate chain networks 20 each include a network ring 26 and three network legs 28a, 28b, 28c extending radially from the ring 26. The two inner legs 28a, 28b each extend from the network ring 26 to eyelets 24 of respective successive traction rings 16. In the illustrated embodiment the two inner legs 28a, 28b each include one studded link 30 having two outward facing studs 32. The outer leg 28c in each intermediate chain network 20 includes a plurality of links 34 and extends from the network ring 26 to a respective parallel side chain 12. The outer leg 28c further includes a studded link 36 adjacent the network ring 26 having two outward facing studs 38. The studs 32, 38 on each of the studded links 30, 36 are generally cylindrically shaped and are positioned spaced from one another on the outward facing surface of the studded link 30, 36. The studded links 30, 36 of the intermediate chain networks 20 are positioned towards the sides of the tire 14 as shown in FIGS. 1-3.

Figure 3A:
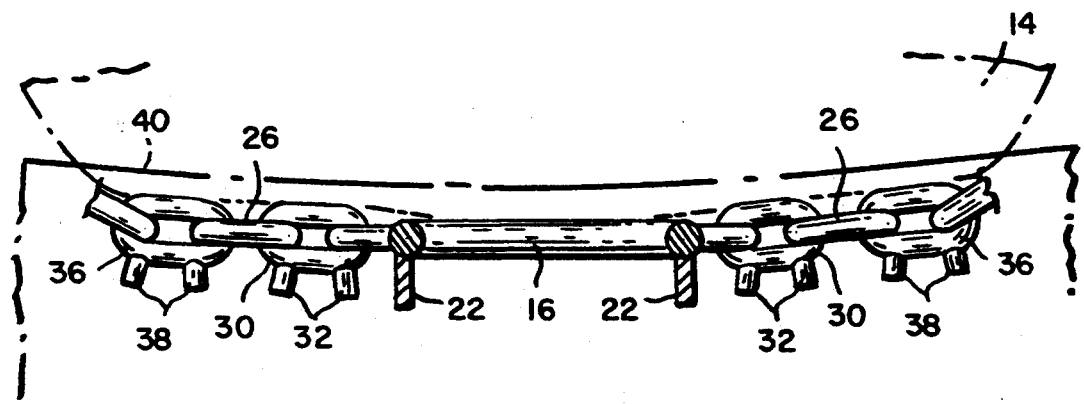
FIG. 3A is a partial diagrammatic view of the tire chain shown in FIG. 1 taken along line 3—3 of FIG. 1 on soft terrain.

As shown in FIG. 3A, during use on soft ground 40 such as mud or snow, the bottom portion of the tire 14 and chain 10 are submerged into the soft ground 40. The traction lugs 22 are thereby effectively able to provide enhanced traction. Although the studs 32, 38 on the links 30, 36 do not significantly contribute to the enhanced traction, they are not sufficiently large that they detract from the soft ground traction provided by the lugs 22.

Figure 3B:
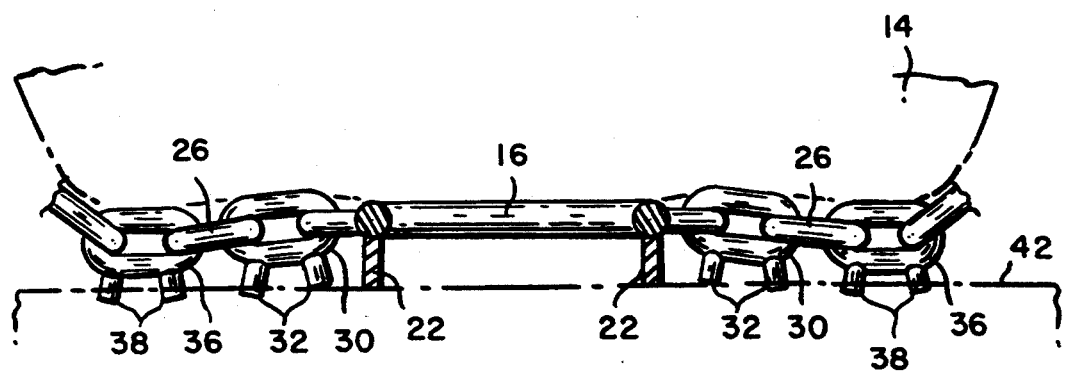
FIG. 3B is a partial diagrammatic view of the tire chain shown in FIG. 1 taken along line 3—3 of FIG. 1 on hard terrain.

As shown in FIG. 3B, during use on frozen ground 42 the traction rings 16 and lugs 22 are pushed up into the tire 14 thereby permitting the studs 32, 38 on the links 30, 36 to contact the frozen ground 42. The studs 32, 38 each have a smaller surface area in contact with the ground and are therefore able to penetrate the frozen ground 42 thus providing enhanced traction. The lugs 22 are not able to sufficiently engage the frozen ground 42 since they each have a larger surface area in contact with the frozen ground 42.

In the present embodiment it is necessary that the tires 14 not be overly inflated to the extent that the traction rings 16 cannot be pushed upward. Otherwise the studs 32,38, which protrude a shorter distance than the lugs 22 in the present embodiment by about ⅜ to ½ of an inch, would not contact the frozen ground 42. In the present embodiment, the lugs protrude approximately 1 ½ inches from the traction rings, and the studs protrude approximately 1 inch from the studded links. Those skilled in the art will appreciate that numerous modifications and variations may be made to the above disclosed embodiment without departing from the spirit and scope of the invention.

I claim:

1. An anti-skid tire chain for use on both soft and frozen terrain, said chain comprising:
   a pair of parallel side chains adapted to encircle opposite sides of a tire;
   a plurality of traction units aligned medially between said side chains and spaced one from the other along the length of said side chains, said traction units including lugs adapted to protrude outwardly from said anti-skid tire chain; and
   a plurality of intermediate chain networks each of which is connected to a traction unit and connected to one of said side chains, said intermediate chain networks including studs adapted to protrude outwardly from said anti-skid tire chain, said studs each including a surface area for contacting the ground that is smaller than the surface area of each of said lugs for contacting the ground.

2. The anti-skid tire chain of claim 1, wherein said lugs protrude to a greater extent than said studs.

3. The anti-skid tire chain of claim 1, wherein said lugs have generally rectangular cross sections and said studs have generally circular cross sections.

4. The anti-skid tire chain according to claim 1, wherein said studs are positioned closer to said side chains than said lugs.

5. The anti-skid tire chain according to claim 1, wherein said intermediate chain networks each include triradially extending legs, two of said legs having inner links connected to respective successive traction units at said inner locations, and the third of said legs connected to a respective side chain and having at least one outer link.

6. The anti-skid tire chain of claim 5, wherein at least some of said studs are arranged on said inner links.

7. The anti-skid tire chain of claim 5, wherein at least some of said studs are arranged on said outer links.

8. The anti-skid tire chain of claim 1, wherein said traction units include traction rings.

9. The anti-skid tire chain of claim 8, wherein said lugs are arcuate.

10. The anti-skid tire chain of claim 1, wherein said studs are generally cylindrically shaped.

11. An anti-skid tire chain for use on both soft and frozen terrain, said chain comprising first and second parallel side chains adapted to encircle opposite sides of a tire, and a chain network extending between said side chains, said chain network comprising:
    a center portion aligned medially between said side chains along the length of said side chains, said center portion including center elements with lugs adapted to protrude radially outwardly from said anti-skid tire chain;
    a first side portion including intermediate chain networks each of which is connected to at least one center element and to said first side chain; and
    a second side portion including intermediate chain networks each of which is connected to at least one center element and to said second side chain, said intermediate chain networks each including studs adapted to protrude radially outwardly from said anti-skid tire chain, and each said stud including a surface area for contacting the ground that is smaller than the surface area of each of said lugs for contacting the ground.

12. An anti-skid tire chain as claimed in claim 11, wherein each of said intermediate chain networks is connected to a pair of adjacent center elements.

13. An anti-skid tire chain as claimed in claim 12, wherein each said intermediate chain network of said first side portion mutually opposes an intermediate chain network of said second side portion that is also connected to the same pair of adjacent center elements as said intermediate chain network of said first side portion such that the pluralities of studs on opposing intermediate chain networks alternate with the pluralities of lugs on said center elements along the length of said side chains.

* * * * *